United States Patent [19]

Pengilly

[11] Patent Number: 4,876,908

[45] Date of Patent: Oct. 31, 1989

[54] TRANSMISSION WITH PLURAL TORQUE TRANSMISSION PATHS

[76] Inventor: Eric A. Pengilly, 17 Wellington Court, Knightsbridge, London SW1, United Kingdom

[21] Appl. No.: 44,269

[22] Filed: Apr. 30, 1987

[30] Foreign Application Priority Data

May 2, 1986 [GB] United Kingdom ................. 8610756

[51] Int. Cl.⁴ ............................................. F16H 57/12
[52] U.S. Cl. ......................................... 74/410; 74/411
[58] Field of Search ................. 74/406, 410, 411, 397, 74/398

[56] References Cited

U.S. PATENT DOCUMENTS

| | | | |
|---|---|---|---|
| 2,516,077 | 7/1950 | Schmitter | 74/410 |
| 3,213,713 | 10/1965 | Sagara | 74/410 X |
| 3,397,591 | 8/1968 | Delescluse | 74/410 |
| 3,424,035 | 1/1969 | Heidrich | 74/410 X |
| 3,839,922 | 10/1974 | Hiersig et al. | 74/410 |
| 3,885,446 | 5/1975 | Pengilly | 74/410 X |
| 4,173,906 | 11/1979 | Altenbokum et al. | 74/410 |
| 4,399,719 | 8/1983 | Chszaniecki et al. | 74/411 X |
| 4,674,350 | 6/1987 | Zaunberger et al. | 74/411 X |

FOREIGN PATENT DOCUMENTS

| | | |
|---|---|---|
| 0163985 | 12/1985 | European Pat. Off. . |
| 1031075B | 5/1958 | Fed. Rep. of Germany . |
| 210229 | 12/1959 | Fed. Rep. of Germany ........ 74/410 |
| 1215463 | 4/1966 | Fed. Rep. of Germany . |
| 2817106A | 11/1978 | Fed. Rep. of Germany . |
| 2819293 | 11/1979 | Fed. Rep. of Germany . |
| 888510 | 1/1962 | United Kingdom ................. 74/410 |
| 1434928 | 5/1976 | United Kingdom . |

*Primary Examiner*—Dwight G. Diehl

[57] ABSTRACT

In a gearbox having a plurality of layshaft gears meshing with a common central gear, a mounting for the central gear rotationally locks that gear with an output shaft, but permits the central gear to pivot about radial axes and to move in radial directions so as to equalize torque transmission through the layshaft gears.

19 Claims, 2 Drawing Sheets

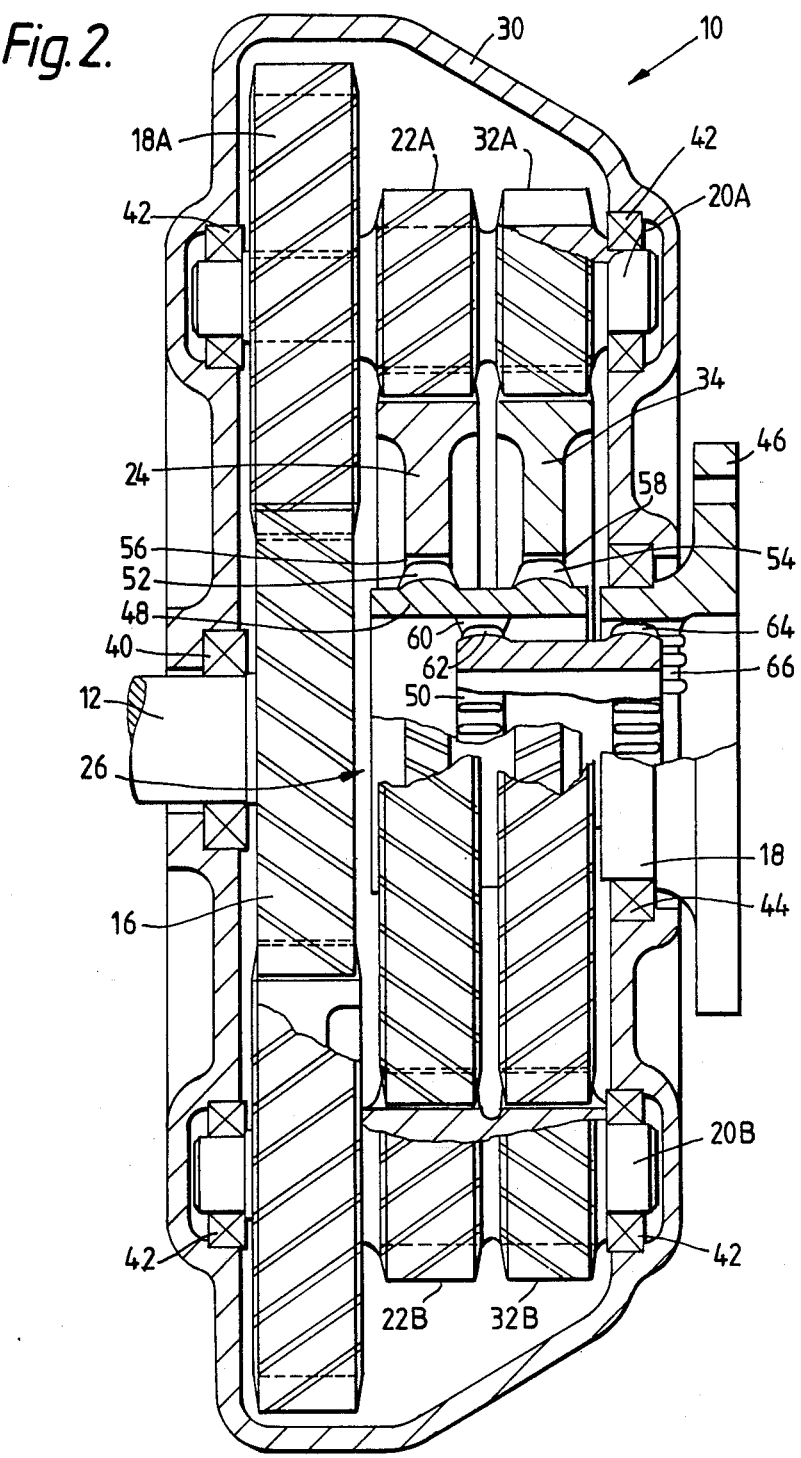

TRANSMISSION WITH PLURAL TORQUE TRANSMISSION PATHS

FIELD OF THE INVENTION

This invention is concerned with a transmission with plural torque transmission paths.

In particular, a first aspect of the present invention relates to a transmission of the type comprising input and output rotatable members between which torque is to be transmitted. A first helical gear is rotatable with one of said members and a plurality of further helical gears are meshed with said first gear. A coupling means is provided for coupling said further gears with the other said member, and a mounting means is provided for said first gear which is arranged to permit the axis of said first gear to pivot about a radial axis under the action of reaction forces arising under load so that torque can be transmitted between the members through each of said further helical gears.

Such a transmission may take the form of a plural-layshaft, helical-gear gearbox in which the further helical gears mentioned above provide the layshaft gears, and the first helical gear mentioned above is provided by a common central gear meshing with both layshaft gears.

BACKGROUND OF THE INVENTION

A transmission of this type is described in British Patent Specification GB No. 1,434,928. The purpose of the movable mounting means for the central gear is to attempt to equalize the sharing of torque transmission between the layshafts and between the layshaft gears. Thus if one of the layshaft gears is transmitting a greater torque than the other, pivoting of the central gear occurs which tends to urge the teeth of the central gear and said other layshaft gear more firmly into engagement with each other and thus increases the torque transmitted through maid other layshaft gear and reduces the torque transmitted through said one layshaft gear. In effect, a closed helicoidal torque loop is established and maintained during the transmission of power, and the transmission can be designed on the basis that the total torque transmitted will be shared approximately equally by the layshafts and layshaft gears. Without such a pivotal mounting means, inequalities of torque sharing caused by machining and/or assembly errors lead to higher maximum torques being transmitted through one or both of the layshafts, and thus a stronger construction is required.

A problem which arises due to the pivotal mounting means is that, when the central gear is pivoted from a normal position, that is to say with the plane of the gear not at right angles to the axial direction, frictional forces arising between the gear teeth act in a direction which tends to return the central gear to the normal position, especially when substantial pivoting occurs, thus preventing complete compensation for torque inequalities between the two layshafts. Furthermore, when the central gear is pivoted from its normal position, the primary pressure bearing regions of the layshaft gear teeth are laterally displaced from the centers of the teeth and perfect meshing between the teeth of the central and layshaft gears is not achieved. The gear teeth must therefore be made more robust than would otherwise be required.

SUMMARY OF THE INVENTION

The first aspect of the invention seeks to provide better torque equalization between the gears and to enable better meshing between the gear teeth. To this end, the first aspect of the invention provides a transmission of the type defined above, which is characterised in that the mounting means is arranged also to permit the first gear axis to move in a radial direction.

In the case where two of said further helical gears are provided disposed diametrically opposite each other with respect to the first gear (for example, a twin-layshaft gear box), the radial direction of permitted movement is preferably substantially perpendicular to the plane containing the axes of the first and further gears. In this case, or in the case of other types of transmission (such as a multi-layshaft gearbox), the mounting means is preferably arranged to permit the gear axis to move in all radial directions.

By permitting such radial movement, any imbalance between the tangential components of the forces arising between the further gears and the first gear is compensated for by displacement of the first gear axis in the radial direction. Furthermore by permitting movement in all radial directions, any imbalance between the radial components of the forces arising between the further gears and the first gear is compensated for by other radial movements.

In the case where two of said further helical gears are provided disposed diametrically opposite each other with respect to the first gear (for example, a twin-layshaft gearbox), the radial axis of permitted pivoting movement is preferably substantially perpendicular to the plane containing the axes of the first and further gears. In this case, or in the case of other types of transmission (for example, a multi-layshaft gearbox), the mounting means is preferably arranged to permit the first gear to pivot about all radial axes.

By permitting such pivoting movement, any imbalance between the moments about the axis of the first gear of the axial components of the forces arising between the further gears and the first gear is compensated for by pivoting. Since the lever-arms of the axial components are approximately equal about the axis of the first gear, equalization of the moments of the axial components leads to approximate equalization of the axial components themselves. In the case where movement in all radial directions and pivoting are both permitted, compensation is thus made for imbalances between the tangential components, the radial components and the axial components of the forces between the first gear and the further gears.

A second aspect of the invention relates to a transmission comprising input and output rotatable members between which torque is to be transmitted. First and second helical gears are rotatable with one of said members. A first plurality of further helical gears are meshed with said first gear, and a second plurality of further helical gears are meshed with said second gear. A coupling means is provided for coupling all of said further gears with the other of said members, and a mounting means is provided for said first and second gears which is arranged to permit the axes of each of said first and second gears to move in a radial direction and to pivot about respective radial axes under the action of reaction forces arising under load so that torque can be transmitted between said members through each of said further helical gears.

The first helical gear may be arranged with its teeth staggered by half a pitch relative to the teeth of said second helical gear, in order to increase the smoothness of torque transmission.

The first helical gear is preferably of opposite hand to said second helical gear. Thus, when the further gears meshing with the first and second gears share a common layshaft, the axial forces applied to the layshaft counteract each other.

The mounting means preferably comprises a torque transmission element on which each of said first and second gears is mounted for pivotal movement, said torque transmission element being arranged for radial and pivotal movement to provide for said radial movement of said first and second gears. Thus a simple manner of providing for independent radial and pivotal movement of the first and second gears is provided.

A problem arising with the use of helical gears is that the axial components of the forces arising at the teeth of the gears must be reacted by the gear mounting. This becomes a serious problem when radial movement of the gear must also be permitted. In the case where oppositely handed first and second gears, and a torque transmission element are provided as described above, one way of solving this problem is to provide first helical spline means connecting said first gear to said torque transmission element and having the same hand and the same axial lead of helix as said first gear; and second helical spline means connecting said second gear to said torque transmission element and having the same hand and the same axial lead of helix as said second helical gear. Thus, the axial components reacted by the torque transmission element with respect to the first and second gears act in opposite directions, and thus, when equal, cancel each other completely, so that no further axial force needs to be applied to the torque transmission element. Accordingly, a rockable element may be provided for connecting said torque transmission element to said one member (e.g. an input or output shaft) whilst permimtting said radial and pivotal movement of said torque transmission element, and said torque transmission element may take the form of a sleeve whilst said rockable element may include a portion located inside said sleeve, said transmission further including straight spline means connecting said portion of said rockable element to said sleeve, since no substantial axial force needs to be reacted.

Said one member may be hollow and a further portion of said rockable element may be located in said hollow one member, further straight splines means being provided to connect said rockable element to said one member. Thus, no substantial axial force needs to be applied to said one member.

BRIEF DESCRIPTION OF THE DRAWINGS

FIG. 2 is a side elevation, partially sectioned and partially cut-away, of a single speed ratio range box embodying the invention.

DESCRIPTION OF PREFERRED EMBODIMENTS

Figure 1:
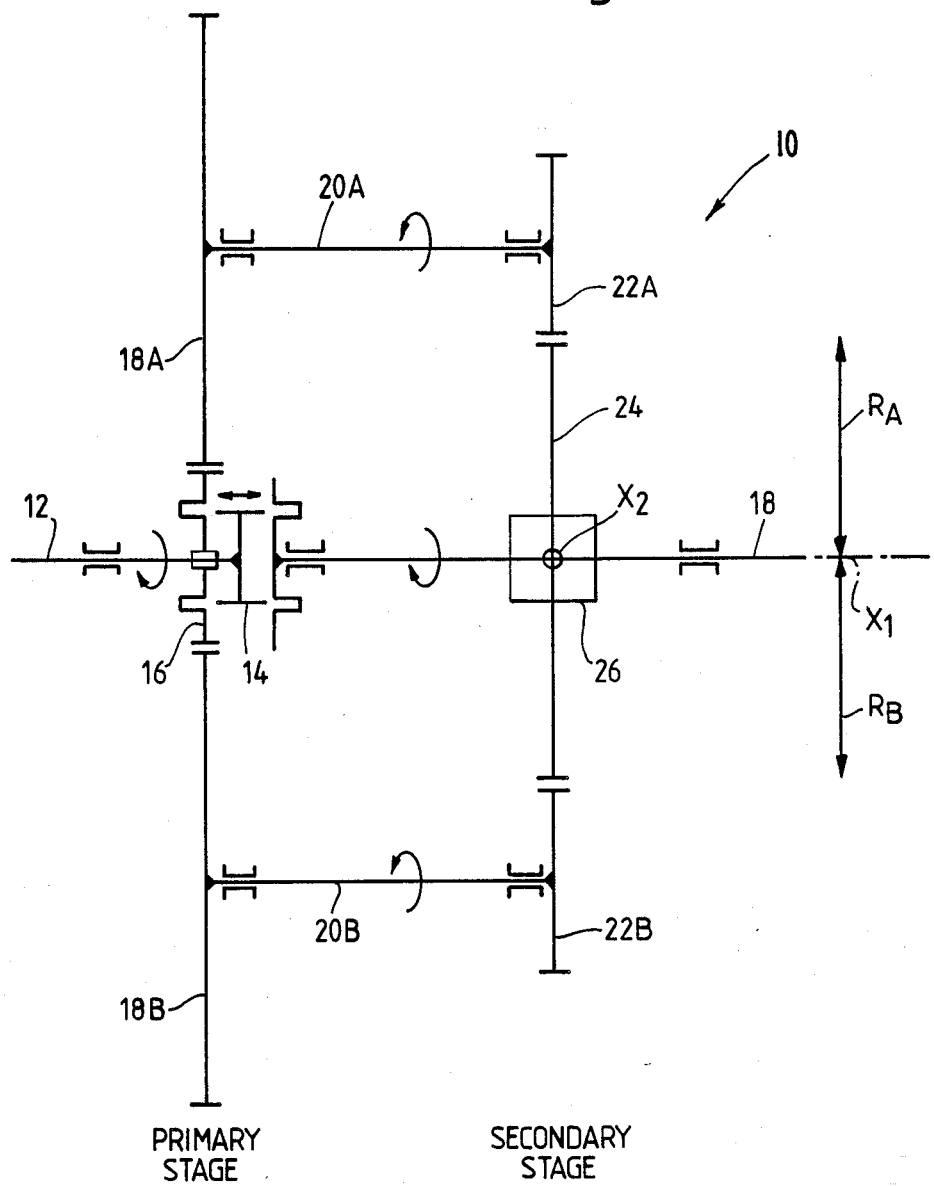
FIG. 1 is a schematic drawing of a two-speed ratio range box which may embody the invention.

Referring to FIG. 1, there is shown a schematic diagram of a two-speed range box 10. An input shaft 12 carries a dog-clutch 14 which can be engaged selectively with (i) an input primary gear 16 freely rotatable on the input shaft 12, and (ii) a coaxial output shaft 18.

The input primary gear 16 constantly meshes with two layshaft primary gears 18A, 18B fixed to respective layshafts 20A, 20B. The input and layshaft primary gears 16, 18A, 18B may be spur gears, but are preferably helical gears. Each layshaft has fixed thereon a respective layshaft secondary gear 22A, 22B, both of which constantly mesh with an output secondary gear 24. The layshaft and output secondary gears 22A, 22B, 24 are helical gears. The output secondary gear 24 is rotationally fixed to, but movable in certain other respects relative to, the 7 output shaft 18 by a mounting means 26 described below. When the dog-clutch 14 is engaged with the output shaft 18, drive can be transferred directly from the input shaft 12 to the output shaft 18, with a 1:1 ratio, and the layshaft gears 22A, 22B, 18A, 18B and input primary gear 16 over-run. On the other hand, when the dog clutch 14 is engaged with the input primary gear 16, drive can be transferred from the input shaft 12 to the output shaft 18 via the input primary gear 16, layshaft primary gears 18A, 18B, layshafts 20A, 20B, layshaft secondary gears 22A, 22B, output secondary gear 24 and mounting means 26. With the relative gear sizes shown in FIG. 1, the input-output speed ratio is approximately 6.25:1.

Since helical gears are employed ±or the secondary gears 22A, 22B, 24, the force on each tooth not only has a component in the tangential direction (that is the drive transmitting component) and a component in the radial direction (due to the angle of the pressure line), but also has an axial component due to the inclination of the teeth to the axial direction.

In a case where the mounting means 26 is arranged to hold the output gear 24 in a plane normal to the axis $X_1$ of of the output shaft, it would need to apply to the output gear 24 a torque equal to the difference in the moments of the axial components on the opposed teeth engaging the layshaft gears 22A, 22B about a radial axis $X_2$ perpendicular to the plane containing the layshafts and output shaft.

In the arrangement described in GB No. 1,434,928, the mounting means 26 does not hold the output gear 24 in the plane normal to the output shaft axis $X_1$, but rather permits it to pivot. Therefore, the output gear 24 will pivot about the axis $X_2$ so as to reduce to zero the difference between the moments of the axial components on the opposed teeth about the axis $X_2$. Thus, since the lever-arms $R_A$, $R_B$ of the axial components about the axis $X_2$ are approximately equal, the axial components become approximately equal. Furthermore, since the ratio of axial to tangential components on the engaging teeth are approximately equal, then the tangential components become approximately equal, and so there is approximately equal torque sharing between the two layshafts. The torque sharing will not, however, be exactly equal, because in practice the lever-arms $R_A$, $R_B$, for example, will not be exactly equal due to manufacturing errors, and the ratios of tangential to axial components on the engaging teeth will not be equal due to tooth formation errors and frictional differences.

In an arrangement in accordance with the invention, the output gear 24 is permitted to move in the direction of the axis $X_2$, that is in a direction perpendicular to the plane containing the layshaft and output shaft. The output gear will therefore move in this direction until the difference between the tangential components of the opposed teeth is zero. This therefore leads far more directly than in the prior arrangement to equal torque sharing between the two layshafts.

Equalization of torque sharing has been considered until now in this specific description as equalization of the tangential components of the forces applied to the gear teeth, that is to say the components resulting from the input torques in the layshafts and providing in combination the output torque. In a gearing arrangement of this type, the basic elements most susceptible to damage are the gear teeth, and it is preferably to equalize not merely the tangential components but the resultant forces on the gear teeth of the three mutually orthogonal tangential, axial and radial components. This can be achieved by allowing equalization of not only the tangential components as described above but also by allowing equalization of the axial components and equalization of the radial components. In order to do this, the output gear 24 may be permitted to pivot, as in the prior arrangement, so that the moments of the axial components about the axis $X_2$ are equalized and thus the axial components are approximately equalized.

Furthermore, the output gear 24 may be permitted to move in all radial directions, rather than merely in the direction of the axis $X_2$ as described above, so that the radial components are, equalized.

It will be appreciated that the axial components on the opposed teeth of the output gear 24 act in the same, rather than opposite, directions, and must therefore be reacted at the mounting means 26 by a substantial reaction equal to the sum of the axial components. There is therefore a notable problem in providing such a reaction whilst also permitting radial movement of the output gear 24. In very light load applications a simple radially-facing abutment, or pair of abutments, might be sufficient, but for heavy vehicle applications, especially in a range box transmitting very large torques, such a reaction member would quickly be destroyed and an alternative solution is necessary. One solution is described below.

Referring to FIG. 2, there is shown a range box, in which features similar to those of FIG. 1 are designated by like reference numbers. The range box of FIG. 2 does not have provision for speed-ratio selection, but may be modified to include the dog-clutch arrangement shown schematically in FIG. 1.

The range box 10 has a housing 30 in which the input shaft 12 is mounted by a bearing 40. The input shaft is coupled, for example, to the output shaft of a vehicle multi-speed gearbox. The helical input primary gear 16 is fixed to the input shaft 12. The layshafts 20A, 20B are mounted in the housing 30 by bearings 42 at the opposed ends thereof, and the output shaft 18, which is hollow, is also mounted in the housing 30 by a bearing 44 and terminates in a power take-off flange 46, which may be connected, for example, to a vehicle propellor shaft. The layshafts 20A, 20B each have two layshaft secondary gears 22A, 32A and 22B, 32B, and two output secondary gears 24, 34 are provided. These gears are arranged in a herring-bone formation, that is to say the gears 22A, 22B, 34 have left-handed helical teeth, and the gears 32A, 32B, 24 have right-handed helical teeth.

The mounting means 26 comprises a torsion sleeve 48 on which the output gears 24, 34 are mounted and a drive shaft 50 extending between the torsion sleeve 48 and the output shaft 18. For each output gear 24, 34, the torsion sleeve 48 has crowned external helical splines 52, 54, respectively, which engage complementary internal helical splines 56, 58 respectively, on the output gears 24, 34, respectively. The splines 52, 56 are of the same hand as the teeth of the respective output gear 24, that is right-handed, and have the same lead as those teeth, and similarly the splines 54, 58 are of the same hand (that is left-handed) and lead as the teeth of the respective output gear 34. The torsion sleeve 48 also has internal spur (that is, axially-extending) splines 60 which engage complementary external splines 62 at one end of the drive shaft 50. The other end of the drive shaft 50 has similar external spur splines 64 which engage with complementary internal splines 66 on the output shaft 18.

It will be noted that the drive shaft 50 is rotationally locked to the output shaft 18 by splines 64, 66, but relative movement of those splines permits the drive shaft to rock and thus permits the end of the drive shaft 50 carrying the splines 62 (and thus the center of torsion sleeve 48 carrying the splines 60) to move in all radial directions. Furthermore, the engagement of the splines 60 on the torsion sleeve 48 with the splines 62 on the drive shaft 50 locks the torsion sleeve 48 against rotation about the axis of the sleeve 48 relative to the drive shaft 50, but relative movement of those splines permits the torsion sleeve to rock relative to the end of the drive shaft 50 which carries the splines 62. This rocking of the torsion sleeve 48 causes the ends thereof which carry the splines 52,54 to move in mutually opposite radial directions relative to the center of the torsion sleeve 48 which carries the splines 60. Since the center of the torsion sleeve 48 can move in all radial directions, as noted above, the opposite ends of the torsion sleeve 48 can therefore move independently in all radial directions, to a limited extent relative to each other. For example, when one end of torsion sleeve 48 is stationary, the other end can be moved radially with respect to driveshaft 50 to accommodate engagement with output gear 34. In addition, the splines 52, 56 and 54, 58 permit each output gear 24,34 to pivot about its center relative to the respective end of the torsion sleeve 48 independently of pivotal movement of the other output gear 34,24. Thus, the combined effect of the drive shaft 50, the torsion sleeve 48, and splines 52 to 66 is to permit the output gears 24,34 to pivot independently of each other and to move radially independently of each other, the radial movement of each gear also being permitted independently of the pivotal movement thereof.

The effect of the helical splines 52, 56 between the torsion sleeve 48 and output gear 24 is such that the torque transferred from the output gear 24 to the torsion sleeve 48 produces an axial reaction between the splines 52, 56 which is of substantially equal magnitude and opposite direction to the sum of the axial components of the forces applied to the opposed teeth of the output gear 24. Thus, the resultant of the axial forces applied to the output gear 24 is substantially zero. Similarly, the resultant of the axial forces applied to the other output gear 24 are also substantially zero. However, since the hand of the splines 54, 58 is opposite to that of the splines 52, 56, the axial reaction between the splines 54, 58 acts on the torsion sleeve 48 in the opposite direction to that between the splines 52, 56. Thus, the resultant of the axial reactions applied to the splines 52, 54 and thus to the torsion sleeve 48 is substantially zero. This, therefore, enables the spur splines 60, 62 to be used between the torsion sleeve 48 and drive shaft 50 and between the drive shaft 50 and output shaft 18, and thus there are substantially no axial forces applied by the helical form of the gear teeth or splines to the drive shaft 50 and output shaft 18. It will be appreciated that, due to frictional forces and inertia of the moving components, the forces which are intended to counteract and cancel each other may not do so completely and may leave a small resultant axial force acting on the output gears 24, 34 or torsion sleeve 48, which would tend to displace these gears or the sleeve axially. In order to prevent excessive displacement taking place, the relative axial movement of the interengaging helical and spur splines may be limited by the use of circlips, or more preferably by elastomeric cushionings employed somewhat similarly to the blocks 42 described and shown in FIG. 1 of GB No. 1,434,928.

What I claim is:

1. A transmission comprising input and output rotatable members between which torque is to be transmitted, a first single-helical gear rotatable with one of said members, a plurality of further helical gears meshed with said first gear, coupling means for coupling said further gears with the other said member, and mounting means for said first gear arranged to permit the axis of said first gear to pivot about a radial axis under the action of reaction forces arising under load so that torque can be transmitted between the members through each of said further helical gears, characterized in that the mounting means is arranged also to permit the first gear axis to move in a radial direction independently of the pivoting of the first gear.

2. A transmission as claimed in claim 1, wherein two of said further helical gears are provided disposed diametrically opposite each other with respect to the first gear, and characterized in that the radial direction of permitted movement is substantially perpendicular to the plane containing the axes of the first and further gears.

3. A transmission as claimed in claim 1, characterized in that the mounting means is arranged to permit the gear axis to move in all radial directions.

4. A transmission as claimed in claim 1, wherein two of said further helical gears are provided disposed diametrically opposite each other with respect to the first gear and characterized in that the radial axis of permitted movement is substantially perpendicular to the plane containing the axes of the first and further gears.

5. A transmission as claimed in claim 1, characterized in that the mounting means is arranged to permit the first gear to pivot about all radial axes.

6. A transmission according to claim 1, characterized in that said mounting means comprises a torque transmission element on which said first gear is mounted for said pivotal movement, said torque transmission element being arranged for radial movement to provide for said radial movement of said first gear.

7. A transmission according to claim 6, characterized in that interengaged helical splines are provided respectively inside said first gear and outside said torque transmission element for connecting said first gear to said torque transmission element, said splines having the same hand and the same axial lead of helix as said first helical gear.

8. A transmission according to claim 1, wherein each further gear is mounted for rotation about a respective fixed axis and meshes only with said first gear.

9. A transmission according to claim 1, wherein the axial location of each further gear is fixed.

10. A transmission comprising input and output rotatable members between which torque is to be transmitted, first and single-helical gears rotatable with one of said members, a first plurality of further helical gears meshed with said first gear, a second plurality of further helical gears meshed with said second gear, coupling means coupling all of said further gears with the other of said members, and mounting means for said first and second gears arranged to permit the axis of each of said first and second gears to move independently of each other in a radial direction and pivot independently on each other and independently of the radial movement about respective radial axes under the action of reaction forces arising under load so that torque can be transmitted between said members through each of said further helical gears.

11. A transmission according to claim 10, characterized in that said first helical gear is of opposite hand to said second helical gear.

12. A transmission according to claim 11, characterized in that said mounting means comprises a torque transmission element on which each of said first and second gears is mounted for pivotal movement, said torque transmission element being arranged for radial and pivotal movement to provide for said radial movement of said first and second gears.

13. A transmission according to claim 12, characterized by first helical spline means connecting said first gear to said torque transmission element and having the same hand and the same axial lead of helix as said first gear; and second helical spline means connecting said second gear to said torque transmission element and having the same hand and the same axial lead of helix as said second helical gear.

14. A transmission according to claim 12, characterized by a drive shaft connecting said torque transmission element to said one member whilst permitting said radial and pivotal movement of said torque transmission element.

15. A transmission according to claim 14, characterized in that said torque transmission element is a sleeve and said drive shaft element includes a portion located inside said sleeve, said transmission further including straight spline means connecting said portion of said drive shaft to said sleeve.

16. A transmission according to claim 15, characterized in that said one member is hollow and a further portion of said drive shaft is located in said hollow one member, further straight splines means being provided o connect said drive shaft to said one member.

17. A transmission according to claim 10, wherein each of said first plurality of further gears is mounted for rotation about a respective fixed axis and meshes only with said first gear, and each of said second plurality of further gears is mounted for rotation about a respective one of said axes and meshes only with said second gear.

18. A transmission according to claim 17, wherein each of the first plurality of further gears is integrally formed as one piece with that one of the second plurality of further gears which is mounted for rotation about the same axis.

19. A transmission according to claim 10, wherein the axial location of each further gear is fixed.

* * * * *